United States Patent (10) Patent No.: US 9,747,343 B2
Barsness et al. (45) Date of Patent: Aug. 29, 2017

(54) ALGORITHMIC CHANGING IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/625,819

(22) Filed: Feb. 19, 2015

(65) Prior Publication Data

US 2016/0248688 A1 Aug. 25, 2016

(51) Int. Cl.
  *G06F 17/30* (2006.01)
  *H04L 12/26* (2006.01)
  *H04L 12/825* (2013.01)
  *H04L 12/861* (2013.01)
  *H04L 29/06* (2006.01)
  *G06F 9/50* (2006.01)

(52) U.S. Cl.
  CPC .......... *G06F 17/30516* (2013.01); *G06F 9/50* (2013.01); *H04L 43/0894* (2013.01); *H04L 47/25* (2013.01); *H04L 49/9005* (2013.01); *H04L 65/604* (2013.01)

(58) Field of Classification Search
  CPC ...................................................... H04L 47/25
  See application file for complete search history.

(56) References Cited

U.S. PATENT DOCUMENTS

| 7,613,848 | B2 | 11/2009 | Amini et al. |
| 7,644,110 | B2 | 1/2010 | Nishizawa et al. |
| 8,060,614 | B2 * | 11/2011 | Goldstein ............. G06F 9/5083 709/226 |
| 8,095,690 | B2 | 1/2012 | Kashiyama et al. |
| 8,560,526 | B2 * | 10/2013 | Santosuosso ....... H04L 67/1097 707/720 |
| 8,560,527 | B2 * | 10/2013 | Santosuosso ....... H04L 67/1097 707/720 |
| 8,666,924 | B2 * | 3/2014 | Hanson .................. H04L 69/22 706/47 |

(Continued)

OTHER PUBLICATIONS

Nogiec et al., "A Dynamically Reconfigurable Data Stream Processing System", Computing in High Energy Physics and Nuclear Physics 2004, Interlaken, Switzerland. DOI: 10.5170/CERN-2005-002.429.

(Continued)

*Primary Examiner* — Lashonda Jacobs
(74) *Attorney, Agent, or Firm* — Robert J. Shatto

(57) ABSTRACT

A stream computing application may permit one job to connect to a data stream of a different job. As more jobs dynamically connect to the data stream, the connections may have a negative impact on the performance of the stream computing application. A variety of performance indicators (e.g., CPU utilization or tuple rate) may be monitored to determine if the dynamic connections are harming performance. If they are, the stream algorithm may be modified to mitigate the effects of the dynamic connections.

20 Claims, 8 Drawing Sheets

(56) References Cited

U.S. PATENT DOCUMENTS

| | | | | |
|---|---|---|---|---|
| 8,831,995 | B2* | 9/2014 | Holler | G06F 8/65 705/51 |
| 9,313,110 | B2* | 4/2016 | Branson | H04L 47/125 |
| 9,477,571 | B2* | 10/2016 | Cao | H04L 41/0896 |
| 9,514,159 | B2* | 12/2016 | Barsness | G06F 17/30289 |
| 2004/0174815 | A1* | 9/2004 | Khisti | H04L 12/2697 370/235 |
| 2007/0288635 | A1* | 12/2007 | Gu | G06F 17/30516 709/226 |
| 2009/0055838 | A1* | 2/2009 | Sedukhin | G06F 11/3612 719/318 |
| 2009/0070767 | A1* | 3/2009 | Garbow | G06F 9/5066 718/104 |
| 2009/0259612 | A1* | 10/2009 | Hanson | H04L 69/32 706/47 |
| 2009/0319687 | A1* | 12/2009 | Goldstein | G06F 9/5083 709/241 |
| 2012/0047505 | A1* | 2/2012 | Branson | G06F 17/30563 718/100 |
| 2012/0218268 | A1 | 8/2012 | Accola et al. | |
| 2013/0031556 | A1 | 1/2013 | Branson et al. | |
| 2013/0054779 | A1* | 2/2013 | Cradick | G06F 15/173 709/224 |
| 2013/0081042 | A1 | 3/2013 | Branson et al. | |
| 2013/0179585 | A1* | 7/2013 | Branson | H04L 65/608 709/231 |
| 2013/0290969 | A1* | 10/2013 | Branson | G06F 9/48 718/102 |
| 2013/0297802 | A1* | 11/2013 | Laribi | H04L 47/80 709/226 |
| 2014/0164628 | A1* | 6/2014 | Branson | G06F 11/3048 709/227 |
| 2014/0278337 | A1* | 9/2014 | Branson | G06F 11/3457 703/22 |
| 2015/0128135 | A1* | 5/2015 | Cao | G06F 17/30958 718/1 |
| 2015/0207749 | A1* | 7/2015 | Cao | H04L 41/0896 709/226 |

OTHER PUBLICATIONS

Ballard et al., "IBM InfoSphere Streams: Harnessing Data in Motion", Sep. 2010, 360 pages, IBM Redbooks http://www.redbooks.ibm.com/abstracts/sg247865.html.

Barsness et al., "Algorithmic Changing in a Streaming Environment," U.S. Appl. No. 14/735,764, filed Jun. 10, 2015.

List of IBM Patents or Patent Applications Treated as Related.

* cited by examiner

ALGORITHMIC CHANGING IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present invention disclose a method for improving a stream algorithm with one or more dynamic connections. A stream manager establishes a contract when an operator is made exportable. The contract contains a set of changes that can be made to the stream algorithm to improve performance. The stream manager monitors a stream computing application to determine if bottleneck conditions are occurring. If a bottleneck condition is present in the stream computing application, the stream manager modifies the stream algorithm by implementing one or more of the changes outlined in the contract.

Additional embodiments of the present disclosure are directed to a system and a computer program product for modifying a stream algorithm composed from a plurality of processing elements.

The above summary is not intended to describe each illustrated embodiment or every implementation of the present disclosure.

BRIEF DESCRIPTION OF THE DRAWINGS

The drawings included in the present application are incorporated into, and for part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
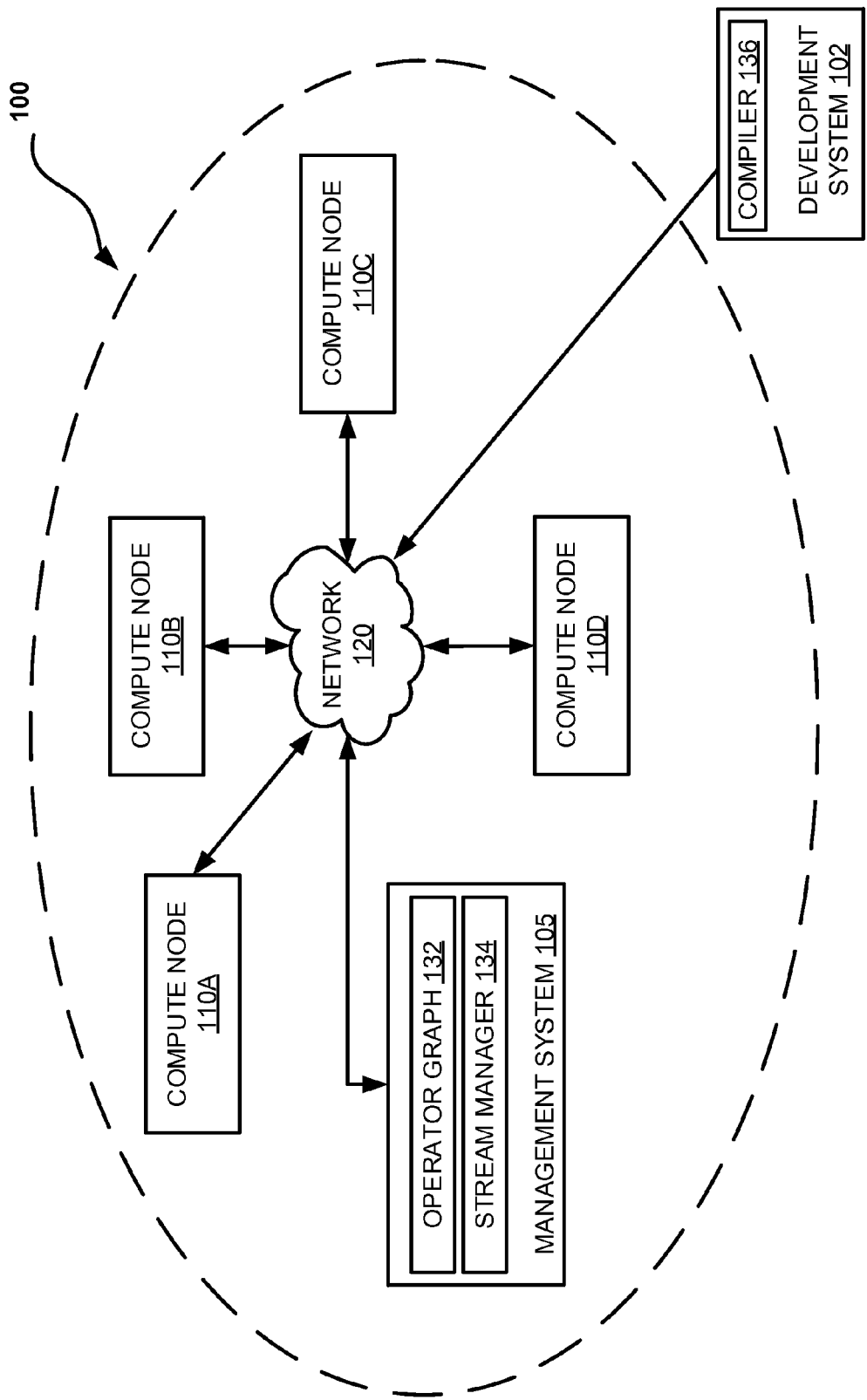
FIG. 1 illustrates a computing infrastructure configured to execute a stream computing application according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph, also referred to as a "stream algorithm," can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

As used herein, an "algorithm" is a sequence of processing operations performed by a stream computing application and not an abstract mathematical formula. For example, an algorithm may be a process or method performed by a computer processor, or other similar machine, that may use a data structure stored in a computer readable memory. A "processor" is any processing unit that carries out the instructions of a computer program. A processor may be, e.g., one or more cores of a multi-core processor, a single-core central processing unit (CPU), or a multi-core CPU.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). This is referred to as a "dynamic connection" because both jobs are currently executing when they begin to share the data stream.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
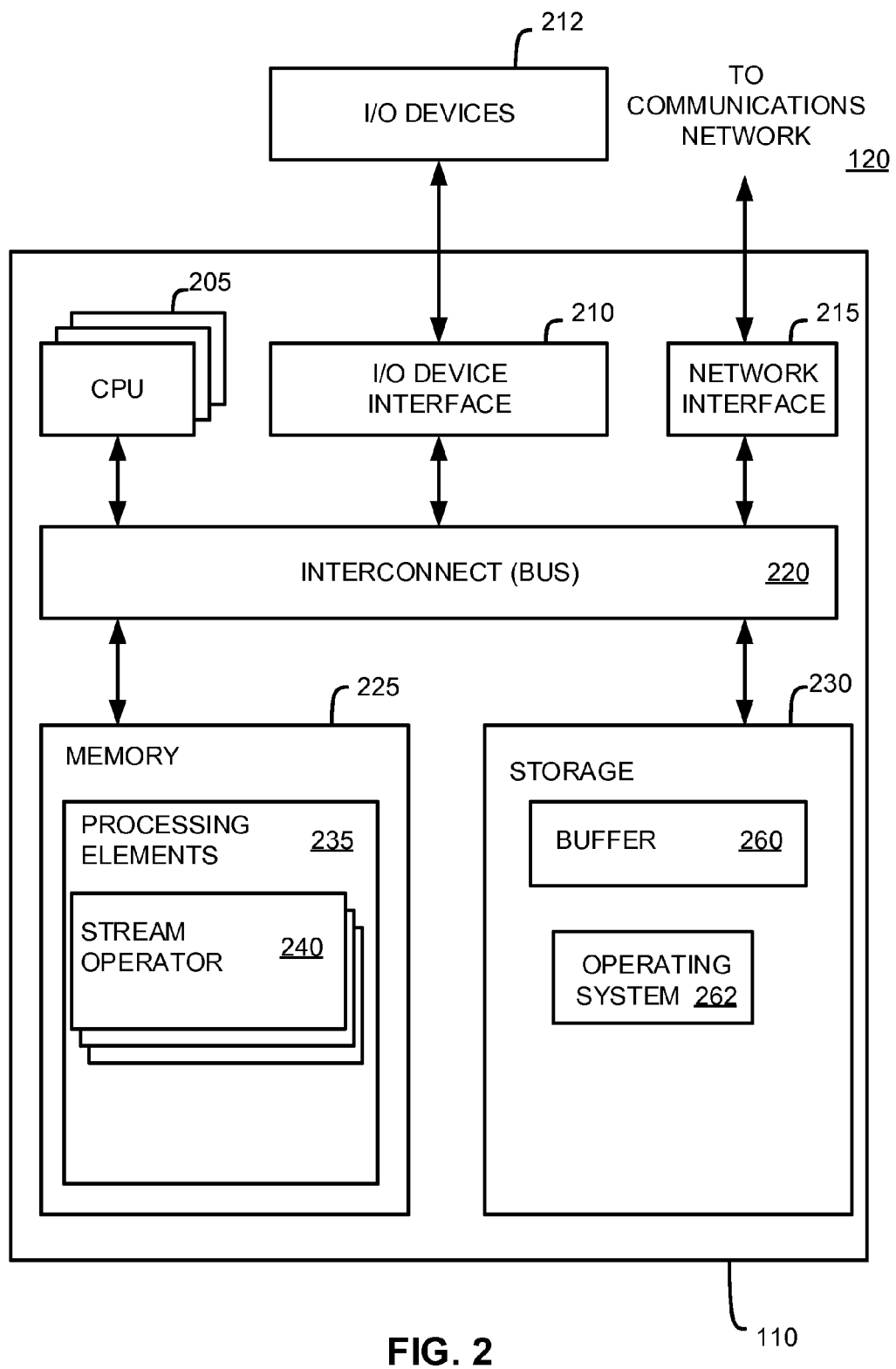
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
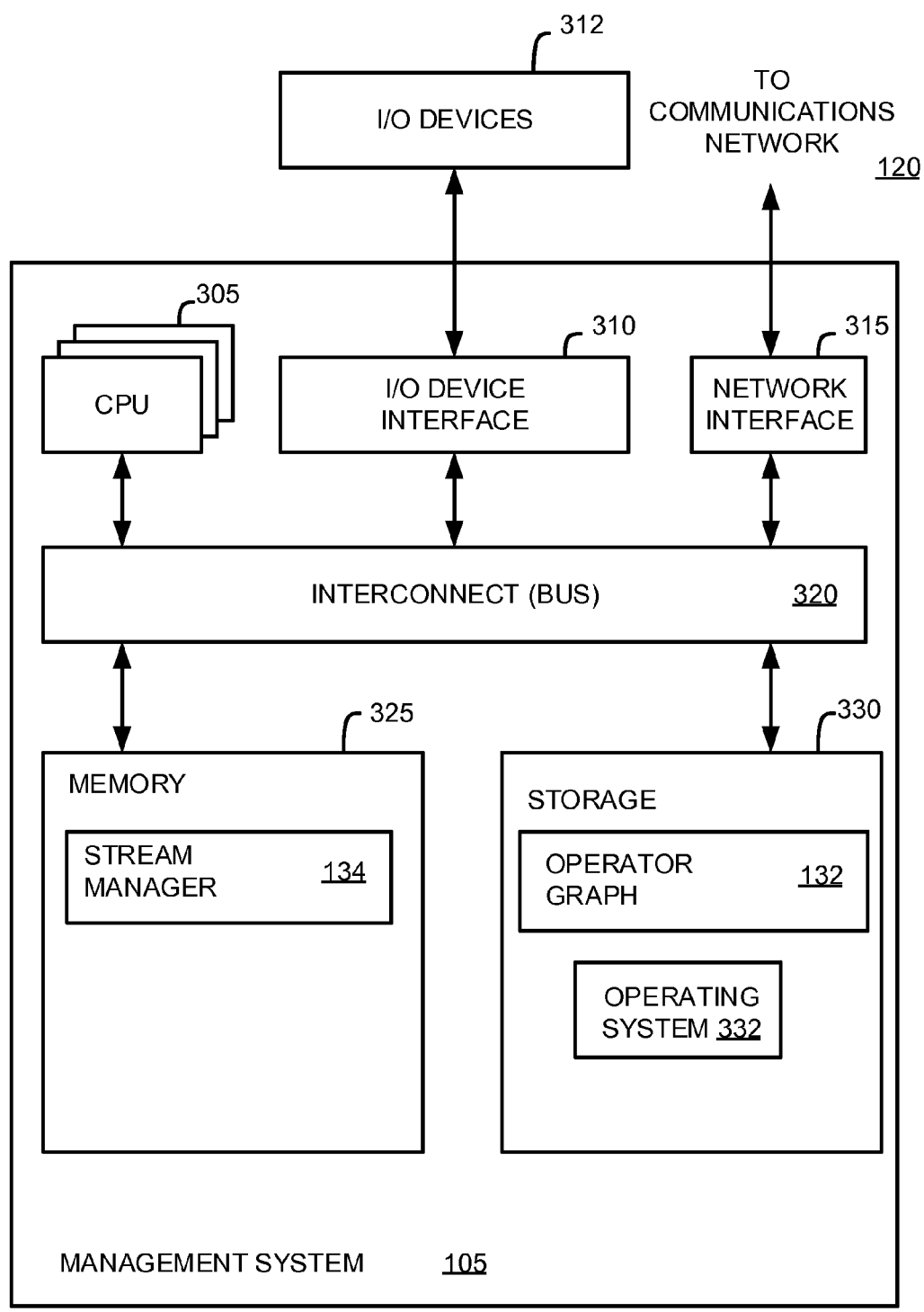
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
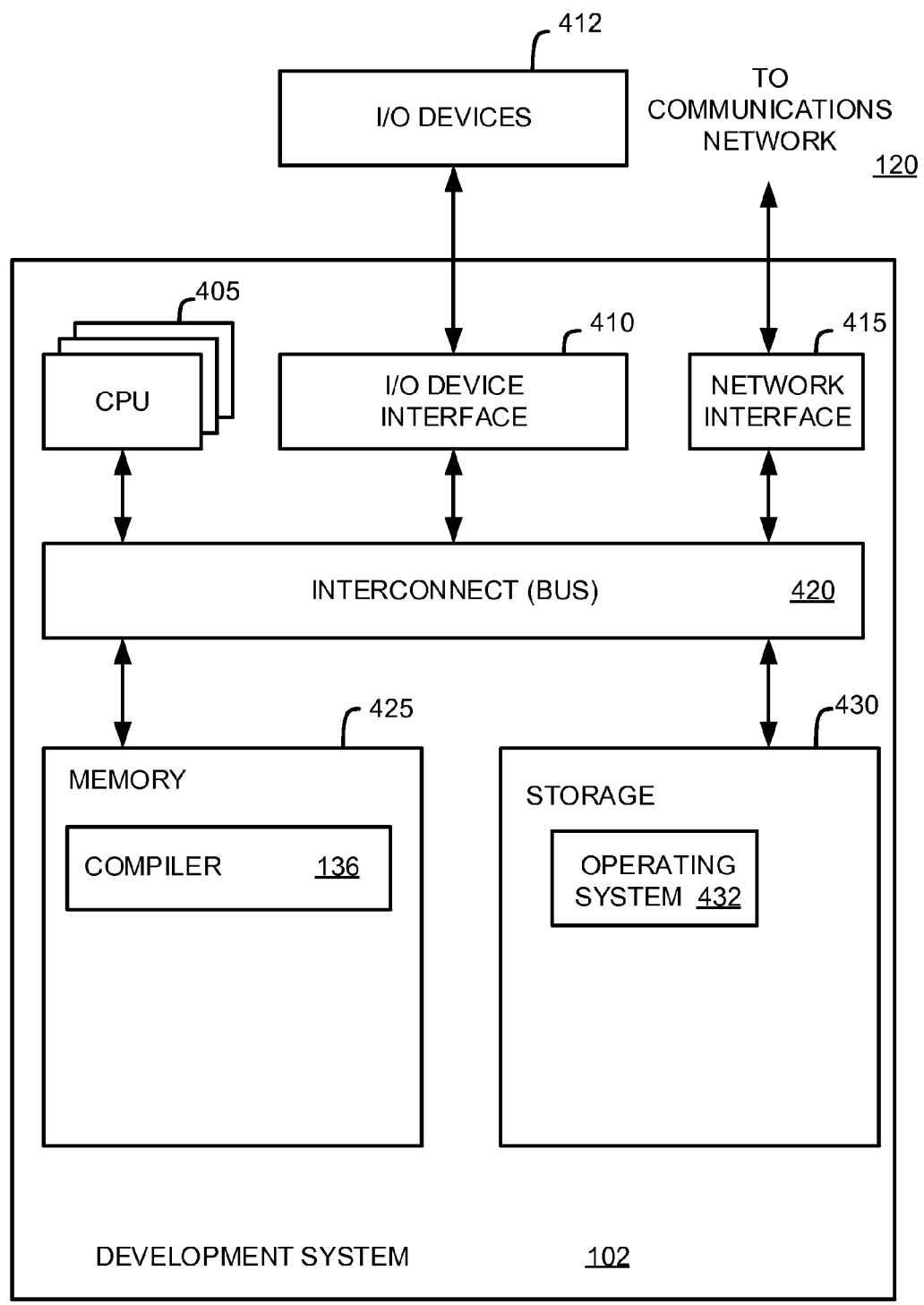
FIG. 4 illustrates a more detailed view of the development system of FIG. 1 according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430.

Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
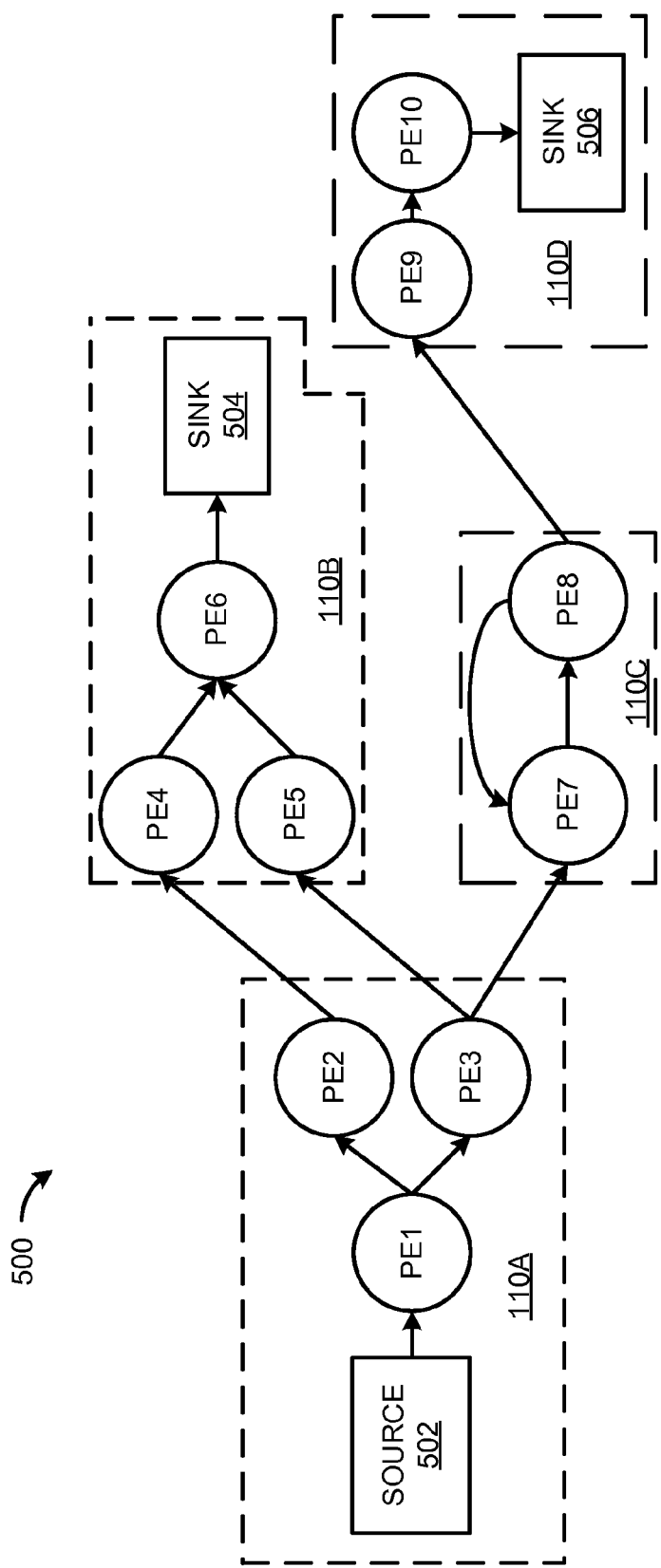
FIG. 5 illustrates an operator graph for a stream computing application according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6A:
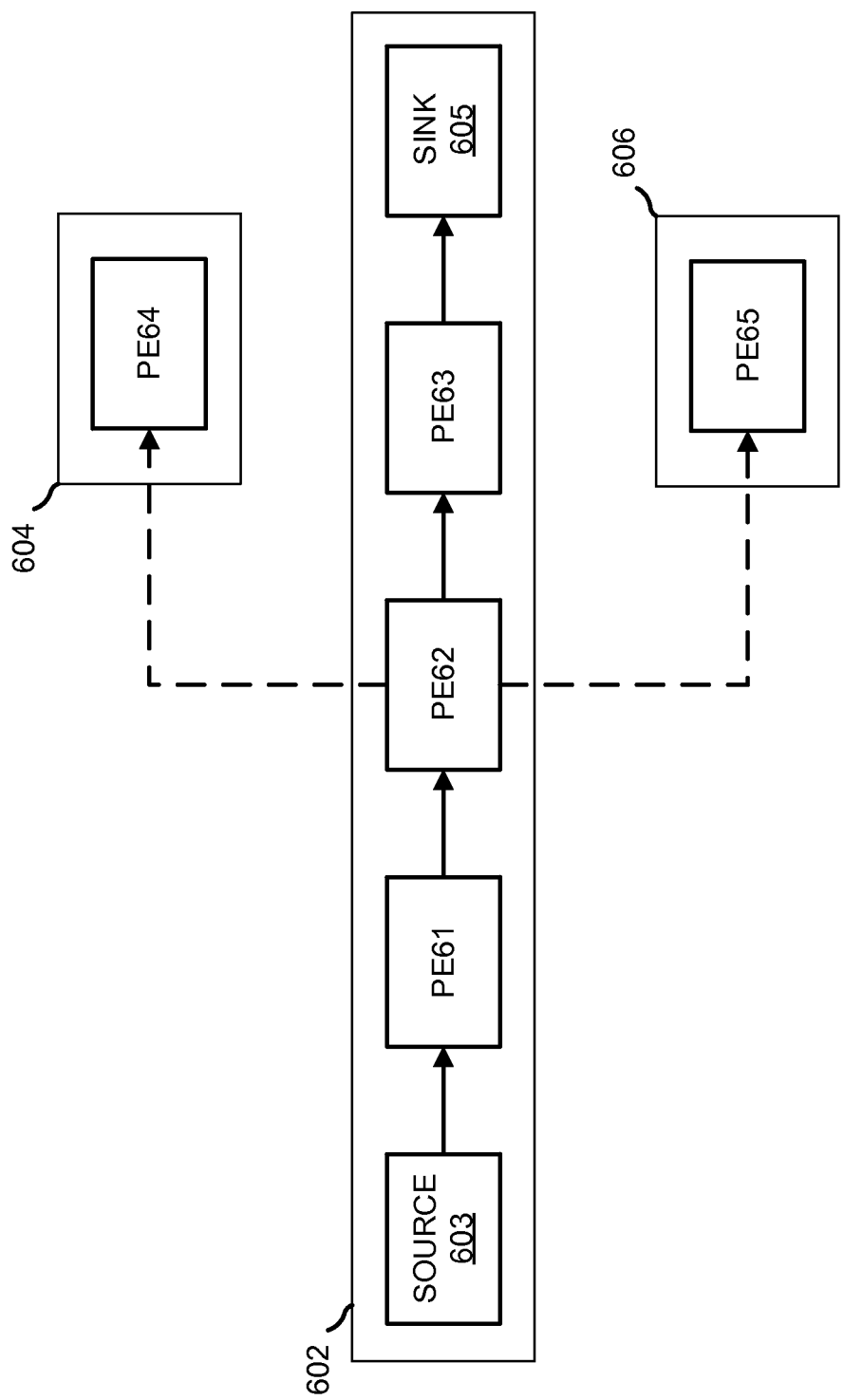
FIG. 6A illustrates an example of a stream computing application in which illustrative embodiments of the present disclosure may be implemented.
Figure 6B:
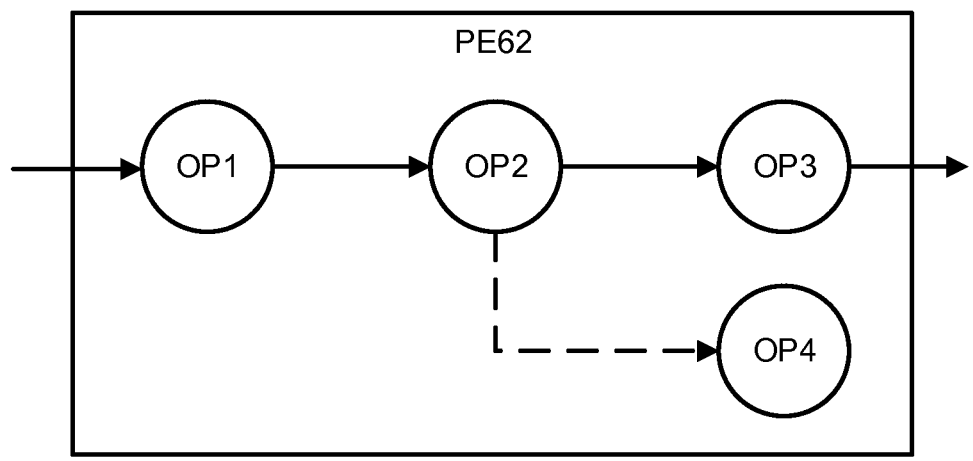
FIG. 6B illustrates an example operator graph of a processing element, in accordance with embodiments of the present disclosure.
Figure 6C:
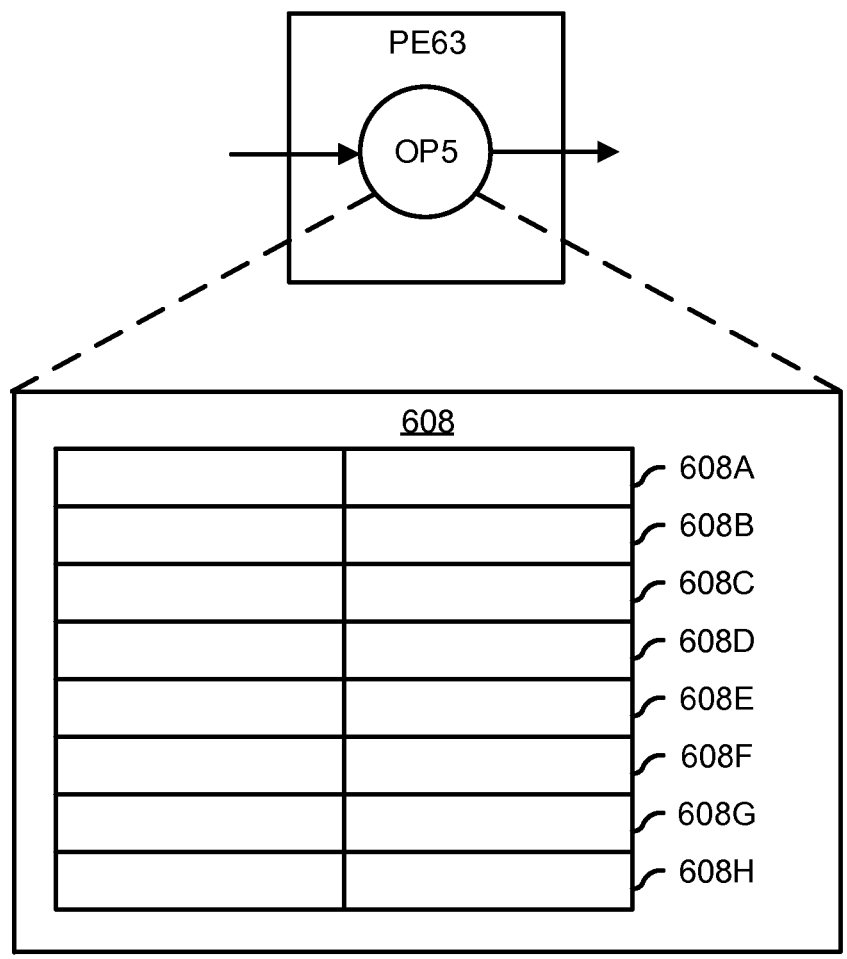
FIG. 6C illustrates an alternative example operator graph of a processing element, in accordance with embodiments of the present disclosure.

FIGS. 6A-6C illustrate an example of a stream computing application in which illustrative embodiments of the present disclosure may be implemented. In this example, audio, such as from a radio broadcast or podcast, is converted to text in real time. This may be done to, e.g., allow people with hearing disabilities to enjoy live radio programming.

Referring now specifically to FIG. 6A, shown is an operator graph of a stream computing application with three jobs 602, 604, and 606. The first job 602 consists of three processing elements PE61-PE63, a source 603, and a sink 605. The first processing element PE61 may import audio data from the source 603, which may be, e.g., a radio broadcast or a podcast. The second processing element PE62 may be responsible for converting the imported audio data to text, and the third processing element PE63 may be responsible for, amongst other things, saving key words from the text in an associative array. While the first job 602 may be used to provide text of a radio broadcast to people with hearing disabilities, other jobs may want access to the text. For example, someone may want to keep track of how often a sports star or team is mentioned during a sports talk radio broadcast.

To accommodate different uses of the text, the second processing element PE62 may be made exportable to allow other jobs, e.g., the second job 604 and the third job 606, to dynamically connect to the second processing element PE62. The second and third jobs 604 and 606 may have one or more processing elements, such as a fourth processing element PE64 and a fifth processing element PE65 respectively, that import the data stream from the second processing element PE62.

As more jobs dynamically connect to the second processing element PE62, the dynamic connections may have a negative impact on the performance of the first job 602, on other dynamically connected jobs (such as the second and third jobs 604 and 606), or on the operation of the entire stream computing application. For example, if the third job 606 is slow at processing its data, the second processing element PE62 may have to slow down the tuple rate (i.e. the rate at which it is sending out tuples) so that it does not overload the third job 606 or its memory buffer. Because the second processing element PE62 may send out its tuples to the third processing element PE63, the second job 604, and the third job 606 simultaneously, slow processing at the third job 606 may cause backpressure that slows down the second job 604, as well as the saving operation performed by the third processing element PE63 in the first job 602.

Referring now to FIG. 6B, shown is an example operator graph of a processing element PE62, in accordance with embodiments of the present disclosure. As discussed in reference to FIG. 6A, the second processing element PE62 may be responsible for performing a text to speech operation on audio imported from the first processing element PE61. The second processing element PE62 may include two branches and be composed of four operators OP1-OP4. PE62 may have a first branch that transmits data from OP1 to OP2 to OP3, and a second branch that transmits data from OP1 to OP2 to OP4.

The first operator OP1 may reduce the background noise in the audio to make the speech clearer, allowing a more accurate speech to text operation. The second operator OP2 may convert the speech into text. The text may then be provided to end users so that they can read the text in real time by the third operator OP3. A fourth operator OP4 may, e.g., take the text from OP2, translate it to a different language, and provide the translated version of the text to a different set of end users.

Referring now to FIG. 6C, shown is an additional example operator graph of a processing element PE63, in accordance with embodiments of the present disclosure. As discussed in reference to FIG. 6A, the third processing element PE63 may be responsible for storing key words from the text. The third processing element may be used to create tags by, e.g., storing key words and the number of times the word appear in the text in an associative array 608. The associative array 608 may have a plurality of rows 608A-H.

Figure 7:
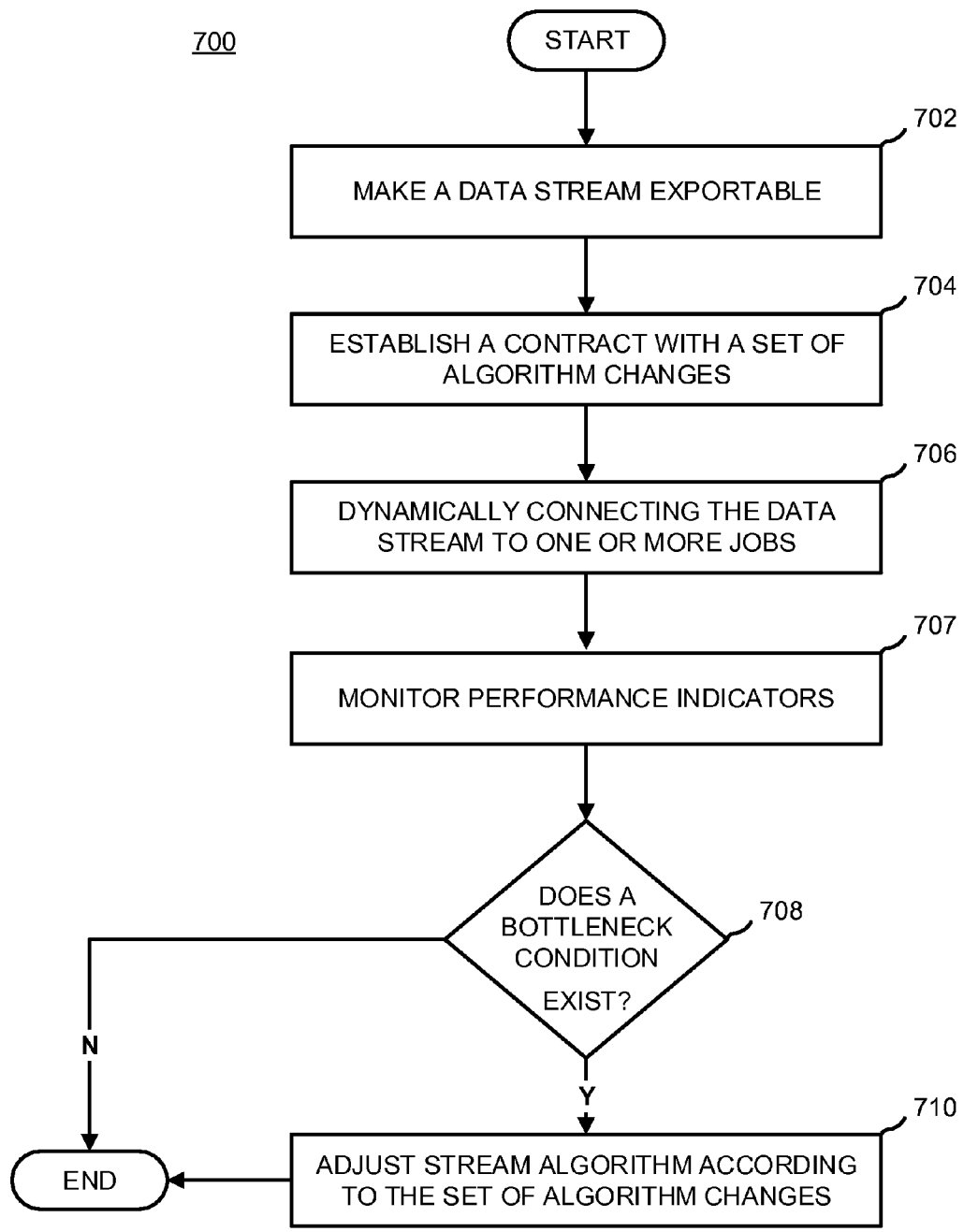
FIG. 7 is a flowchart illustrating a method for modifying a stream algorithm, in accordance with embodiments of the present disclosure.

Referring now to FIG. 7, shown is a flowchart illustrating a method 700 for modifying a stream algorithm, in accordance with various embodiments of the present disclosure. In some embodiments, the method 700 may be performed by a stream manager 134 (shown in FIG. 1). The method 700 may begin at operation 702, where the stream manager sets a data stream as exportable.

At operation 704, the stream manager may establish a contract. In some embodiments, the stream manager may establish the contract when a dynamic connection is made to the exportable operator, instead of when a data stream is made exportable. The contract may outline a set of algorithm changes that can be implemented when bottleneck conditions are discovered. The algorithm changes may modify operators, processing elements, or execution paths to reduce the negative effects of the dynamic connections on the stream computing application. In some embodiments, the algorithm changes may change the operation of the exporting job, e.g., the first job 602 in FIG. 6A. In other embodiments, the algorithm changes may change the operation of an importing job, e.g., the second or third jobs 604 and 606 in FIG. 6A. In still other embodiments, the algorithm changes may change the operation of both the exporting job as well as one or more importing job(s).

In some embodiments, the stream manager may unilaterally establish the algorithm changes for all operators, processing elements, and jobs in the stream computing application. In other embodiments, permissible algorithm changes may be decided by individual processing elements or jobs. When establishing the contract, the stream manager may then choose which of the permissible algorithm changes to implement under bottleneck conditions. In still other embodiments, the stream manager may request permission from the dynamically connected jobs to establish specific algorithm changes to that job in the contract. The job's administrator may then accept or deny the requested algorithm changes.

For example, the contract may establish changes made to the second processing element PE62 (shown in FIG. 6B) when bottleneck conditions are discovered. As discussed in reference to FIG. 6B, the second processing element PE62 may contain four operators (OP1-OP4). The third operator OP3 provides English language text of a radio broadcast to end users, and the fourth operator OP4 provides a translated text of the radio broadcast to end users. When bottleneck conditions are present, it may be desirable to prioritize the English language text over the translated version because, e.g., there may be more users who wish to read the English language text than there are readers of the translated text. Accordingly, OP4 may be marked as non-operational under bottleneck conditions. If a bottleneck condition is discovered, OP1-OP3 will operate normally, while OP4 will not be performed. In some embodiments, OP2 may send tuples to OP4, but OP4 will not process the data. In other embodiments, when the bottleneck condition is detected, OP2 may be modified so that it no longer sends tuples to OP4.

In some embodiments, when a bottleneck condition is discovered, the contract may replace one or more operators, processing elements, or jobs with a "light" version. The light version may perform similar operations as the standard version, but the light version may have a smaller impact on CPU or memory utilization. For example, instead of marking the execution path between the first job 602 and the third job 606 (shown in FIG. 6A) as non-operational and removing it from the stream algorithm, a light version of the third job 606 may replace the standard version. If the third job 606 translates the text into another language, the light version may only look for and translate key words or phrases, reducing the impact of the third job 606 on the stream computing application.

For another example, the contract may establish changes made to the third processing element PE63 (shown in FIG. 6C) when a bottleneck condition is discovered. As discussed in reference to FIG. 6C, the fifth operator OP5 is responsible for saving key words and the number of times they appear in an associative array 608. When bottleneck conditions are present, it may be desirable to limit the size of data structures, such as the associative array 608, to limit the CPU and memory usage required by the operator OP5. Accordingly, when bottleneck conditions are found, the stream manager may only allow OP5 to store information in the first 4 rows 608A-D of the associated array 608.

At operation 706, one or more jobs may dynamically connect to the exportable processing element (or operator) by importing the exportable data stream. At operation 707, the stream manager may monitor one or more performance indicators which may measure the performance of the operators, processing elements, or the computer hardware. For example, in some embodiments, the stream manager may measure the tuple rate flowing out of an operator. In other embodiments, the stream manager may monitor the tuple rate flowing in to an operator.

In other embodiments, the stream manager may monitor the buffer utilization of one or more operators. For example, the stream manager may monitor how much space is being used in an operator's input buffer. If the input buffer is almost full, this may indicate that the operator is unable to process tuples as fast as they are received. This may result in backpressure, thereby affecting the performance of other operators in the stream.

Similarly, in some embodiments, the stream manager may monitor the backpressure experienced by operators that are upstream from the operator. For example, the stream manager may monitor the utilization of output buffers. If these buffers are full—i.e., the destination operator's buffer is already full, and thus, cannot accept more data tuples—this may indicate that the performance of the stream is decreasing.

In some embodiments, the stream manager may monitor a performance indicator directly associated with the operators (or processing elements) that are generating the data stream which is transmitted to different jobs, for example, the tuple rate or buffer utilization of the second processing element PE62 in FIG. 6A. In other embodiments, the stream manager may monitor performance indicators for some or all of the operators in only the first job 602. In still other embodiments, the stream manager may monitor performance indicators in all of the operators in only the dynamically connected jobs. In still other embodiments, the stream manager may monitor performance indicators in all of the operators or processing elements of the entire stream computing application.

In some embodiments, the stream manager may monitor performance indicators associated with the computer hardware that hosts the operators of the jobs (i.e. the nodes). For example, instead of measuring statistics associated with operators like the tuple rate, the stream manager may monitor the performance metrics of the computer hardware the operators use to process the tuples in the data stream. Different types of metrics that the stream manager may monitor include CPU utilization, bus utilization, memory utilization, and network traffic. If these hardware resources are being used at high levels (e.g., greater than 90% of their maximum load), it may indicate that the resources cannot keep up with the processing demands made by the operators.

For example, if the second processing element PE62 (shown in FIG. 6A) uses TCP/IP to transmit its data stream to a plurality of dynamically connected jobs, the stream manager may monitor the TCP/IP network interface on the compute node that hosts the second processing element PE62. If the buffers associated with the network interface are full, the network interface may be unable to transmit data tuples fast enough to all the different dynamically connected jobs. Similarly, the stream manager may monitor the usage of the bus 220 (shown in FIG. 2) which may be used for intra-nodal communication. If the bus 220 is congested—i.e., applications must wait to gain access to the bus 220—this may indicate that there is a bottleneck condition.

At operation 708, the stream manager may use the one or more performance indicators to determine whether a bottleneck condition exists. In some embodiments, the stream manager may compare one or more of the performance indicators to one or more associated thresholds. An "associated threshold" is a threshold that corresponds to a given performance indicator. For example, in some embodiments the stream manager may use historical data to determine a minimum tuple rate threshold, and then compare the tuple rate of an operator to the tuple rate threshold. If the tuple rate is lower than the threshold, the stream manager may determine that a bottleneck condition is present. In other embodiments, the stream manager may compare the CPU utilization percentage to a predetermined threshold. If the CPU utilization is above the threshold, the stream manager may determine that a bottleneck condition is present. The associated thresholds may be determined by the stream operator, or they may be configurable by a user.

In still other embodiments, the rate of change in the tuple rate or the CPU utilization may be compared to an associated threshold. For example, if the CPU utilization increased from 50% to 65% over a certain time period, this rate of change may exceed a threshold set by an administrator, and thus, indicate that performance is deteriorating and a bottleneck condition is present. Advantageously, monitoring the rate at which these performance indicators change may help to predict performance issues before the throughput of the data streams is affected. That is, the stream computing application may currently be able to satisfy the demands of the jobs, but if the CPU utilization rate continues to climb, the throughput may begin to decrease.

In some embodiments, the stream manager may compare two or more performance indicators to two or more associated thresholds. This strategy may decrease the possibility of detecting a false positive, where only one performance indicator meets a threshold yet the stream computing application's throughput is unaffected. In some embodiments, the stream manager may evaluate at least one performance indicator associated with an operator (e.g., tuple rate or buffer utilization) and at least one performance indicator associated with the compute node that hosts the operator (e.g., CPU, bus, or memory utilization). This may further reduce the likelihood of false positives and increase the ability of the stream manager to accurately measure the performance of the stream computing application.

In some embodiments, the stream manager may determine that a bottleneck condition is present based on the number of dynamic connections that have been made to the exportable processing element. Altering the stream algorithm based on the number of dynamic connections may be advantageous when even short periods of bottlenecking of the stream computing application is intolerable because the algorithm changes may be implemented before the dynamic connection has had a negative effect on the performance of the stream computing application. In some embodiments, the number of dynamic connections that triggers the stream manager to implement algorithm changes may be set by an administrator. In other embodiments, the stream manager may use historical data to predict the number of dynamic connections that can be made before the performance of the stream computing application is negatively impacted.

If the stream manager does not find a bottleneck condition in the processing elements or operators, the method 700 may end. If, however, the stream manager finds a bottleneck condition, the stream operator may adjust the stream algorithm by implementing one or more of the algorithm changes in the contract at operation 710. For example, in some embodiments the stream manager may instruct one or more operators to limit the size of their data structures. In other embodiments, the stream manager may adjust the stream algorithm by instructing processing elements to no longer perform certain methods (e.g., those marked as non-operational in the contract). After the stream manager adjusts the stream algorithm, the method 700 may end.

In some embodiments, all the algorithm changes in the contract may be implemented when a bottleneck condition is discovered. In other embodiments, one or more, but not all, of the algorithm changes may be implemented when a bottleneck condition is detected. In these embodiments, the stream manager may implement some of the algorithm changes and then begin monitoring the performance indicators per operation 707. If the implemented algorithm changes have addressed the bottleneck condition, the method 700 may end. If, however, the bottleneck condition persists, the stream manager may implement more of the algorithm changes per operation 710. This process may be repeated until the bottleneck condition is no longer present, or until all of the algorithm changes outlined in the contract have been implemented.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for modifying a stream computing application comprising:
   a plurality of processing elements to receive a stream of tuples, each processing element including one or more stream operators, wherein one or more of the stream operators include code configured to output tuples to one or more other stream operators;
   two or more processors; and
   a memory containing an application that, when executed, causes at least one of the two or more processors to:

establish a contract wherein the contract includes one or more algorithm changes;

determine whether there are one or more dynamic connections;

determine, in response to determining that there are one or more dynamic connections, whether a bottleneck condition is present; and modify, in response to determining that the bottleneck condition is present, a stream algorithm using the algorithm changes.

2. The system of claim 1, wherein the establishing a contract is performed when an operator is made exportable.

3. The system of claim 1, wherein the establishing a contract is performed when a dynamic connection is made.

4. The system of claim 1, wherein a stream manager must request permission from a job to establish an algorithm change affecting the job in the contract.

5. The system of claim 1, wherein the algorithm changes include removing an execution path from the stream algorithm.

6. The system of claim 1, wherein the algorithm changes include limiting a size of a data structure within the stream algorithm.

7. The system of claim 1, wherein the algorithm changes include replacing an operator with a light version of the operator.

8. The system of claim 1, wherein the algorithm changes include replacing a processing element with a light version of the processing element.

9. The system of claim 1, wherein the algorithm changes include replacing a job with a light version of the job.

10. A computer program product comprising a computer readable storage media having a computer readable program stored therein, wherein the computer readable program, when executed on a computing device, causes the computing device to:

receive a stream of tuples to be processed by a plurality of processing elements, each processing element including one or more stream operators, wherein one or more of the stream operators include code configured to output tuples to one or more other stream operators;

establish a contract wherein the contract includes one or more algorithm changes;

determine whether there are one or more dynamic connections;

determine, in response to determining that there are one or more dynamic connections, whether a bottleneck condition is present; and modify, in response to determining that the bottleneck condition is present, a stream algorithm using the algorithm changes.

11. The computer program product of claim 10, wherein determining whether a bottleneck condition is present comprises:

determining one or more performance indicators; and comparing the performance indicators to one or more associated thresholds.

12. The computer program product of claim 11, wherein the performance indicators include one or more of the group consisting of CPU utilization, bus utilization, memory utilization, and network traffic.

13. The computer program product of claim 11, wherein the performance indicators include one or more of the group consisting of input buffer utilization, output buffer utilization, tuple rate in to an operator, tuple rate out of an operator, and number of dynamic connections.

14. The computer program product of claim 11, wherein the associated thresholds are configurable by a user.

15. The computer program product of claim 11, wherein the associated thresholds are determined by a stream manager.

16. The computer program product of claim 10, wherein the establishing a contract is performed when an operator is made exportable, and wherein modifying the stream algorithm comprises modifying an algorithm of a job that includes the exportable operator.

17. The computer program product of claim 10, wherein the establishing the contract includes:

identifying a first algorithm change to implement under bottleneck conditions, wherein the first algorithm change modify a dynamically connected job;

requesting permission from the dynamically connected job to implement the first algorithm change under bottleneck conditions; and including, in response to receiving permission from the dynamically connected job to implement the first algorithm change under bottleneck conditions, the first algorithm change in the contract.

18. The computer program product of claim 10, wherein the computer readable program, when executed on a computing device, further causes the computing device to:

determine, after modifying the stream algorithm using an algorithm change, that the bottleneck condition is still present; and modify, in response to determining that the bottleneck condition is still present, the stream algorithm using a second algorithm change established in the contract.

19. The computer program product of claim 10, wherein the establishing the contract includes:

determining, by each job in a stream computing application, at least one algorithm change that may be implemented within the respective job in response to the detection of a bottleneck condition.

20. A computer program product comprising a computer readable storage medium having program instructions embodied therewith, the program instructions executable by a processor to cause the processor to perform a method comprising:

receiving a stream of tuples to be processed by a plurality of processing elements operating on one or more computer processors, each processing element including one or more stream operators, wherein one or more of the stream operators are configured to output tuples to one or more other stream operators;

determining whether there are one or more dynamic connections made to an exportable operator;

establishing, in response to a dynamic connection being made by a first job connecting to the exportable operator, a contract, wherein the contract includes one or more algorithm changes that modify the operation of the first job, the one or more algorithm changes being approved by the first job;

monitoring two or more performance indicators, the two or more performance indicators including at least one performance indicator associated with computer hardware and at least one performance indicator associated with a stream operator;

determining, by comparing the two or more performance indicators to associated thresholds, whether a bottleneck condition is present; and modifying, in response to determining that the bottleneck condition is present, a stream algorithm using at least one of the one or more algorithm changes.

\* \* \* \* \*